(12) United States Patent
Orsborn et al.

(10) Patent No.: US 6,408,605 B1
(45) Date of Patent: Jun. 25, 2002

(54) COTTON HARVESTER ROW UNIT

(75) Inventors: Jesse H. Orsborn, Port Byron, IL (US); Kevin S. Richman, Muscatine, IA (US); Monroe C. Barrett, Geneseo; G. Neil Thedford, Naperville, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/511,462

(22) Filed: Feb. 23, 2000

Related U.S. Application Data
(60) Provisional application No. 60/122,069, filed on Mar. 1, 1999.

(51) Int. Cl.[7] .............................................. A01D 46/08
(52) U.S. Cl. .................................... 56/41; 56/28; 56/36
(58) Field of Search ................................ 56/28, 30, 33, 56/36, 40, 41, 50

(56) References Cited

U.S. PATENT DOCUMENTS

| | | | |
|---|---|---|---|
| 228,101 A | | 5/1880 | Moores |
| 898,893 A | | 9/1908 | Hollingsworth |
| 3,176,451 A | * | 4/1965 | Hubbard ...................... 56/13.2 |
| 3,312,047 A | | 4/1967 | Cafaro ........................... 56/48 |
| 4,125,988 A | | 11/1978 | Schlueter ........................ 56/30 |
| 4,249,365 A | | 2/1981 | Hubbard et al. ............. 56/13.2 |
| 4,538,403 A | | 9/1985 | Fachini ........................... 56/44 |
| 4,722,173 A | * | 2/1988 | Covington et al. ............. 56/28 |
| 4,821,497 A | | 4/1989 | Deutsch et al. ................. 56/41 |
| 4,896,492 A | * | 1/1990 | Junge et al. .................... 56/28 |
| 4,914,897 A | | 4/1990 | Orsborn ...................... 56/13.2 |
| 4,922,695 A | * | 5/1990 | Covington et al. ............. 46/40 |
| 4,993,216 A | * | 2/1991 | Covington et al. ............. 56/28 |
| 5,081,828 A | | 1/1992 | Covington et al. ............. 56/28 |
| 5,519,988 A | | 5/1996 | Copley et al. .................. 56/30 |
| 5,557,910 A | * | 9/1996 | Del Rosario ................... 56/30 |
| 5,850,727 A | * | 12/1998 | Fox ................................. 56/28 |
| 6,212,864 B1 | * | 4/2001 | Harden et al. ................. 56/36 |
| 6,293,078 B1 | * | 9/2001 | Deutsch et al. ................ 56/41 |

* cited by examiner

*Primary Examiner*—Robert E. Pezzuto
*Assistant Examiner*—Nathan Mammen
(74) *Attorney, Agent, or Firm*—John William Stader; Larry W. Miller

(57) ABSTRACT

A row unit movable in a forward direction for simultaneously picking cotton from at least two parallel rows of cotton plants, the rows of cotton plants being spaced a predetermined distance apart in a transverse direction relative to the forward direction. The row unit includes a structure or unitary housing having a forward end and an opposite rearward end and containing or defining at least two plant row channels therethrough at locations spaced apart in the transverse direction by an amount about equal to the predetermined distance for simultaneous passage of the at least two rows of cotton plants through the row channels, respectively and at least two picker rotors located within the unitary housing adjacent to the plant row channels therethrough, respectively, each of the picker rotors being mounted for rotation about a generally upright axis and including members which extend into the adjacent plant row channel for picking cotton from the cotton plants passing therethrough as the picker rotor is rotated. A plurality of the row units can be provided on a cotton harvester, mounted forwardly and/or rearwardly thereof.

25 Claims, 15 Drawing Sheets

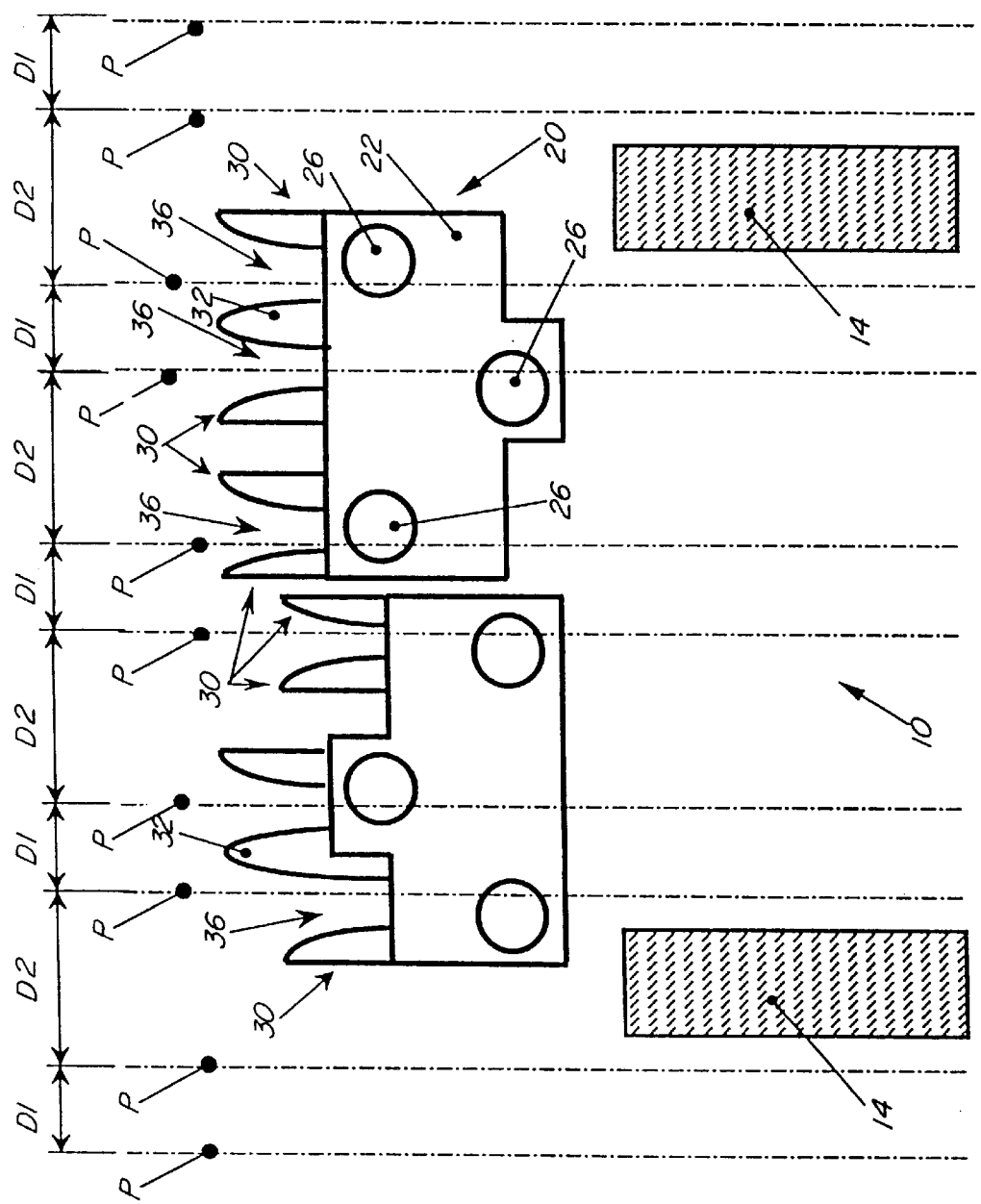

PICKING UNITS CAN BE OF ANY ROTOR CONFIGURATION IN FILE

WALK-BEHIND SINGLE PICKING UNIT

COTTON HARVESTER ROW UNIT

This application claims the benefit of U.S. Provisional Application No. 60/122,069, filed Mar. 1, 1999.

FIELD OF THE INVENTION

The present invention relates to cotton harvesting machines and more particularly to a harvest row unit suitable for harvesting narrow rows of cotton.

BACKGROUND OF THE INVENTION

Conventional self-propelled cotton harvesters include a frame mounted pair of drive wheels, and a pair of steerable rear wheels providing the harvester with proper direction. Mounted, usually, in the front or forward end of the cotton harvester are two or more harvesting units.

Each harvesting unit typically includes a housing which encloses two rotatably driven picker rotors, two doffer assemblies, and a picker spindle moistening assembly for each rotor. Each picker rotor has numerous circularly driven picker bars. Each picker bar mounts a plurality of rotatably driven, radially extending picker spindles for removing cotton from a plant. The doffer assembly includes a column of doffer pads which are positioned to remove the cotton from the picker spindles. The moistener assembly includes a column of moistening pads arranged to add moistening fluid to the cotton picker spindles before they are introduced into the cotton plants.

Cotton pickers typically harvest one to six rows of cotton with the rows spaced usually 38 or 40 inches (96 to 102 centimeters) apart. However, recent cotton planting techniques have resulted in cotton rows being planted as close as 30 inches (76 centimeters) apart.

A particular cotton row planting configuration involves two parallel rows of cotton plants planted 30 centimeters apart with a second grouping of parallel cotton plant rows 60 centimeters from the first cotton plant row grouping. Such arrangement is prevalent and mainly handpicked in mainland China and other third world or developing countries.

Examples of narrow row cotton harvesters are exemplified by U.S. Pat. No. 4,538,403 (issued Sep. 3, 1985) for a "Narrow Row Cotton Harvester and Picker Unit" and U.S. Pat. No. 4,914,897 (issued Apr. 10, 1990) for a "Narrow Row Cotton Harvester". Both of said patents are assigned to the assignee of the present invention. Both of said patents disclose picker units incorporating offset picker rotors and doffer assemblies which pick the cotton on both side s of a single row of cotton plants. The offsetting of the picker assemblies allow for various configurations and nesting of the picker units to facilitate the harvesting of narrow row cotton plants. Two picker/doffer assemblies are mounted in each picker unit to harvest one row of cotton plants.

Another example of the narrow row cotton picker is disclosed in U.S. Pat. No. 5,519,988 (issued May 28, 1996) to Copley, et al., entitled "Narrow Row Cotton Picker and Row Unit Therefor" and U.S. Pat. No. 4,821,497 (issued Apr. 18, 1989) to Deutsch, et al., entitled "Cotton Harvester and Tandem Row Unit Thereof". These latter two patents each disclose picker units that incorporate two picker rotors and associated doffer assemblies that are aligned in tandem to pick cotton from one side of a cotton row plant. Each cotton plant row is picked by two picker/doffer assemblies. In the latter patent disclosures, the picker units must skip a row of cotton plants, particularly in the 30 centimeter planting configuration, which necessitates two passes of the cotton harvesting machine to pick adjacent 30 centimeter rows which are unpicked on the first pass.

Thus there is a need for a cotton harvester that will use only one picker/doffer assembly for each plant row. There is a further need for a cotton harvester that provides more than one picker/doffer assembly in a housing, with at least one picker/doffer assembly for each plant row. There is an additional need for a multi-picker rotor cotton harvester that provides for adjustment of the spacing between the picker rotors to accommodate different spacings between plant rows.

SUMMARY OF THE INVENTION

There is provided a cotton harvester which includes at least one cotton picker unit for harvesting cotton from plants planted in narrow, parallel rows. The cotton picker unit comprises a cotton picker housing that supports a lateral plant lifter which extends forward of the housing and defines a plant row channel for receiving cotton plants planted in a row. The plant channel extends back into the housing to a plant compressor sheet which facilitates the picking of the cotton from the cotton plant by a picker rotor which is supported in the housing adjacent to the plant row channel and traverse to the compressor sheet. A doffer column also supported in the housing is near the picker rotor and removes the picked cotton from the picker rotor and moves the cotton towards an outlet and through an exhaust chute for receiving the cotton. The cotton is then collected in an appropriate cotton basket. Additional cotton picker rotors can be configured in the cotton picker housing including a wishbone plant lifter extending forward of the housing approximately midway between a space defined by the adjacent lateral plant lifters. The cotton picker unit picks one or more rows of cotton plants with independent rotor/doffer assemblies. Various configurations of multiple cotton picker units can be arranged and mounted on mounting mechanisms attached to a self-propelled vehicle of the cotton harvester. An embodiment includes multiple opposing rotor/doffer assemblies mounted in a cotton picker housing picking opposite sides of adjacent cotton rows planted at a spacing less than the width of the cotton picker rotor. This embodiment provides at least one picker rotor rotating in a clockwise direction and at least one picker rotor rotating in a counterclockwise direction. An additional embodiment of the cotton harvester of the present invention includes a walk-behind cotton harvester and comprises a cotton picker housing having a pair of lateral plant lifters mounted forward of the housing and defining a plant channel extending back into the housing to a plant compressor sheet. Also mounted in the walk-behind cotton harvester is a picker rotor and a doffer column arranged to pick cotton off the cotton plant moving through the plant channel and moving the picked cotton to an outlet at the rear of the cotton picker housing. A power unit is in mechanical communication with the picker rotor and doffer column and may also be in mechanical communication with a means for moving the walk-behind cotton harvester. The walk-behind cotton harvester is provided for harvesting row planted cotton, particularly for use in developing countries.

An alternative embodiment of the present cotton harvester includes a self-propelled vehicle having a mounting mechanism and a multi-rotor unit in mechanical communication with the power unit. The multi-rotor unit comprises a cotton picker housing that is mounted on the mounting mechanism and supporting at least one lateral plant lifter and at least one wishbone plant lifter extending forward of the housing and defining a plant row channel for receiving cotton plants planted in a row. The channel extends back into the housing to plant compressor sheets which facilitates the picking of cotton from cotton plants by multiple picker rotors and associated doffer columns located traverse to the compressor sheet. The cotton is then moved to an outlet and into an appropriate cotton collecting basket. Various configurations of cotton picker units mounted both forward of the mounting mechanism and behind the mounting mechanism which is attached to the self-propelled vehicle is provided to accommodate various cotton field plantings.

Other features and advantages of the present invention will become readily apparent from the following detailed description, appended drawings and accompanying claims.

BRIEF DESCRIPTION OF THE DRAWINGS

FIG. 7 is a schematic illustration of an exemplar cotton picker multi-rotor unit.

Figure 1:
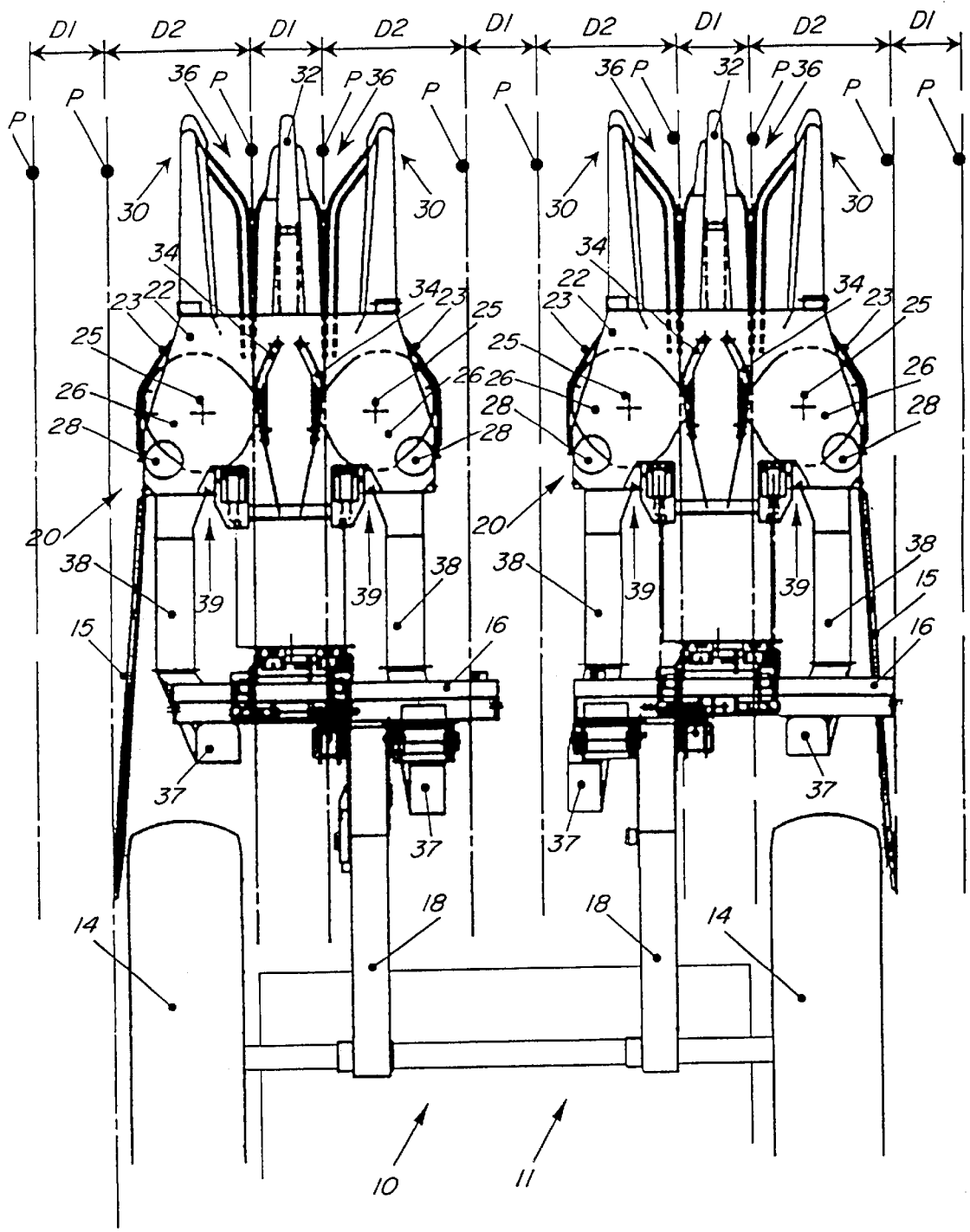
FIG. 1 is a partial top elevational view showing two cotton picker units of an exemplar cotton harvester mounted on a self-propelled vehicle (only the wheels are shown).

Before explaining the preferred embodiment of the cotton harvester row unit in detail, it is to be understood that the cotton harvester row unit is not limited in the application to the details of construction and the arrangement of components set forth in the following description or as illustrated in the drawings. The cotton harvester row unit is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

Referring now to FIG. 1, therein is shown a cotton harvester 10 mounted on a self-propelled vehicle 11 which supports a power unit (not shown). The self-propelled vehicle has a plurality of wheels 14 of which only two are typically shown in the FIGURES. A cotton receiving basket (not shown) may be supported on the self-propelled vehicle or towed behind or adjacent to the self-propelled vehicle for receiving picked cotton from the cotton harvester 10 of the present invention.

A cotton picker unit 20 of the present invention includes a cotton picker housing 22. Mounted on the cotton picker housing 22 is at least one lateral plant lifter 30 extending forward of the housing and defining a plant row channel 36 for receiving cotton plants P planted in a row. The plant channel 36 extends from the lateral plant lifter 30 back into the housing 22 to a plant compressor sheet 34 mounted in the cotton picker housing 22. As the cotton harvester 10 moves through the cotton field the individual cotton plant rows P are aligned with the cotton plant channel 36 in each cotton picker unit. The lateral plant lifter 30 guides the cotton plant toward the plant compressor sheet 34 so that the individual cotton bolls can be picked.

A picker rotor 26 is supported by the cotton picker housing 22 for rotation about an upright axis 25 at a location adjacent to the plant row channel 36 in the cotton picker housing 22 opposite, or traverse, to the compressor sheet 34. As the cotton plant moves through the plant channel 36 the plant compressor sheet 34 assists the picker rotor 26 in picking the cotton bolls. Spindles on the picker rotor move into the cotton plants and engage the cotton lint of the cotton boll and pull the cotton lint from the cotton plant. As the cotton harvester 10 continues moving down the cotton plant row P the picker rotor rotates generally synchronized with the plant until the spindles are withdrawn from the cotton plant, then the picked cotton is removed from the picker rotor by a doffer column 28 supported by the cotton picker housing 22 near the picker rotor 26. The doffer column 28 in addition to removing the picked cotton from the picker rotor 26 also moves the cotton towards an outlet 38 at the back of the cotton picker unit 20 to an exhaust chute 37 which receives the cotton from the outlet 38. The exhaust chute 37 can be engaged by any convenient and conventional means for collecting the picked cotton, such as a basket mounted on the self-propelled vehicle 11, or a wagon can be pulled by an appropriate means for hitching a wagon or the like to collect and retain the picked cotton. A trash exit 39 at the back of the cotton picker housing 22 ejects cotton plant debris not collected by the harvester.

Prior art cotton pickers typically use two picker rotors for each plant row, with one picker rotor on each side of the plant row picking cotton from that same row. The present cotton picker unit 20 uses only one picker rotor 26 to pick cotton from one plant row but may have multiple picker rotors 26 mounted in the same housing 22 with each picker rotor 26 picking from a different plant row. Another embodiment provides multiple rotors 26 mounted in the same housing 22, with a tandem set of picker rotors 22 picking cotton from the same plant row but from the same side of that plant row and another set of tandem picker rotors 22 picking cotton from a different plant row.

FIG. 1 depicts two cotton picker units 20, each consisting of two oppositely aligned rotor assemblies 26, of the present invention mounted on the front of a self-propelled vehicle 11 constituting a cotton harvester 10. Each cotton picker unit 20 is provided with a cotton picker drive (not shown) which is in mechanical communication with the picker rotor 26 and the doffer column 28. The cotton picker drive can be from a group comprising a hydraulic motor, an electric motor, a fossil fuel engine and a power take-off (PTO) unit. The cotton picker unit 20 of the present invention is conveniently arranged in multiple configurations. FIGS. 2–12 illustrate several embodiments of cotton picker unit 20 configurations.

Figure 2:
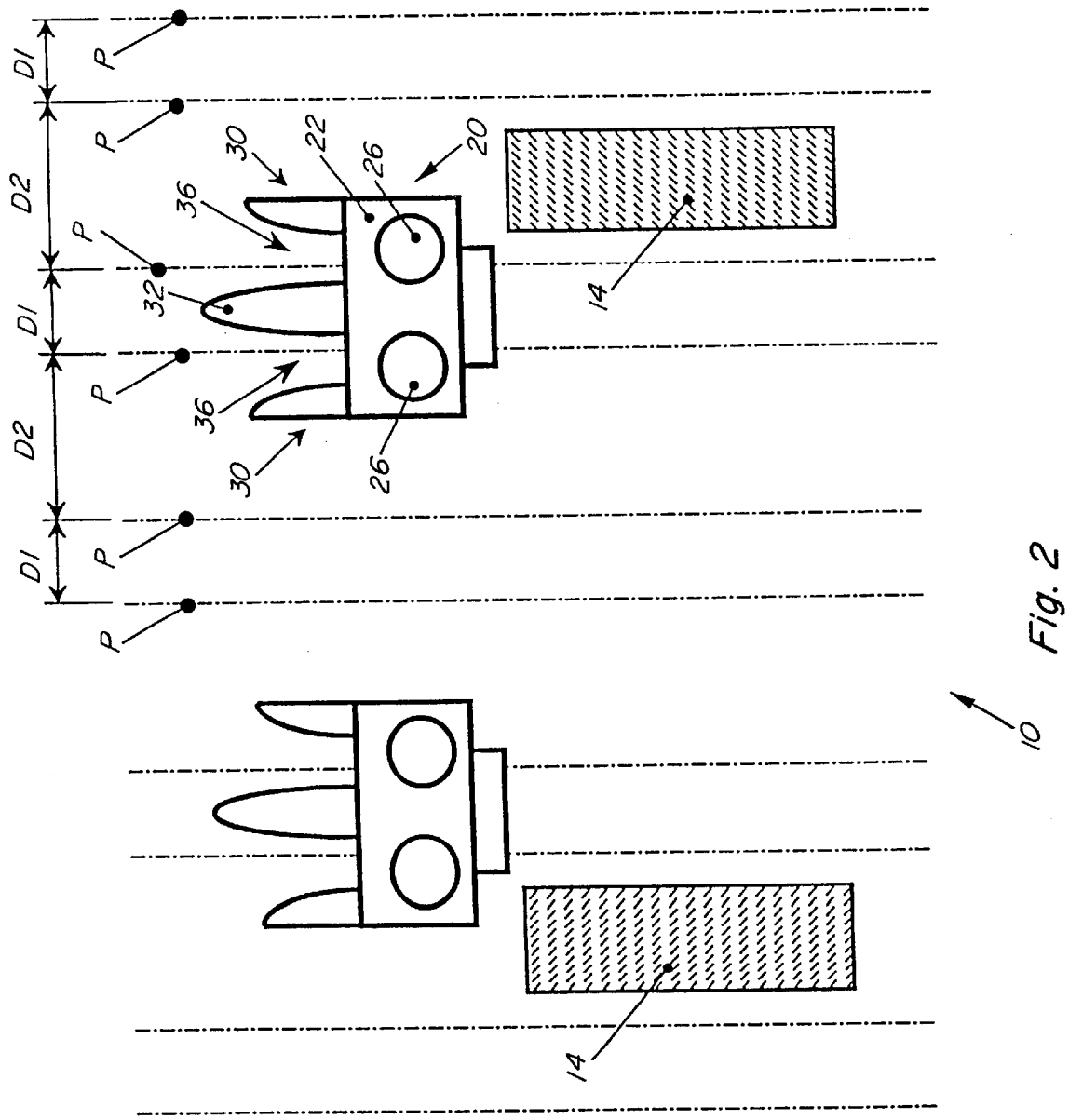
FIG. 2 is a schematic illustration of two cotton picker units each consisting of two oppositely aligned rotor assemblies.
Figure 3:
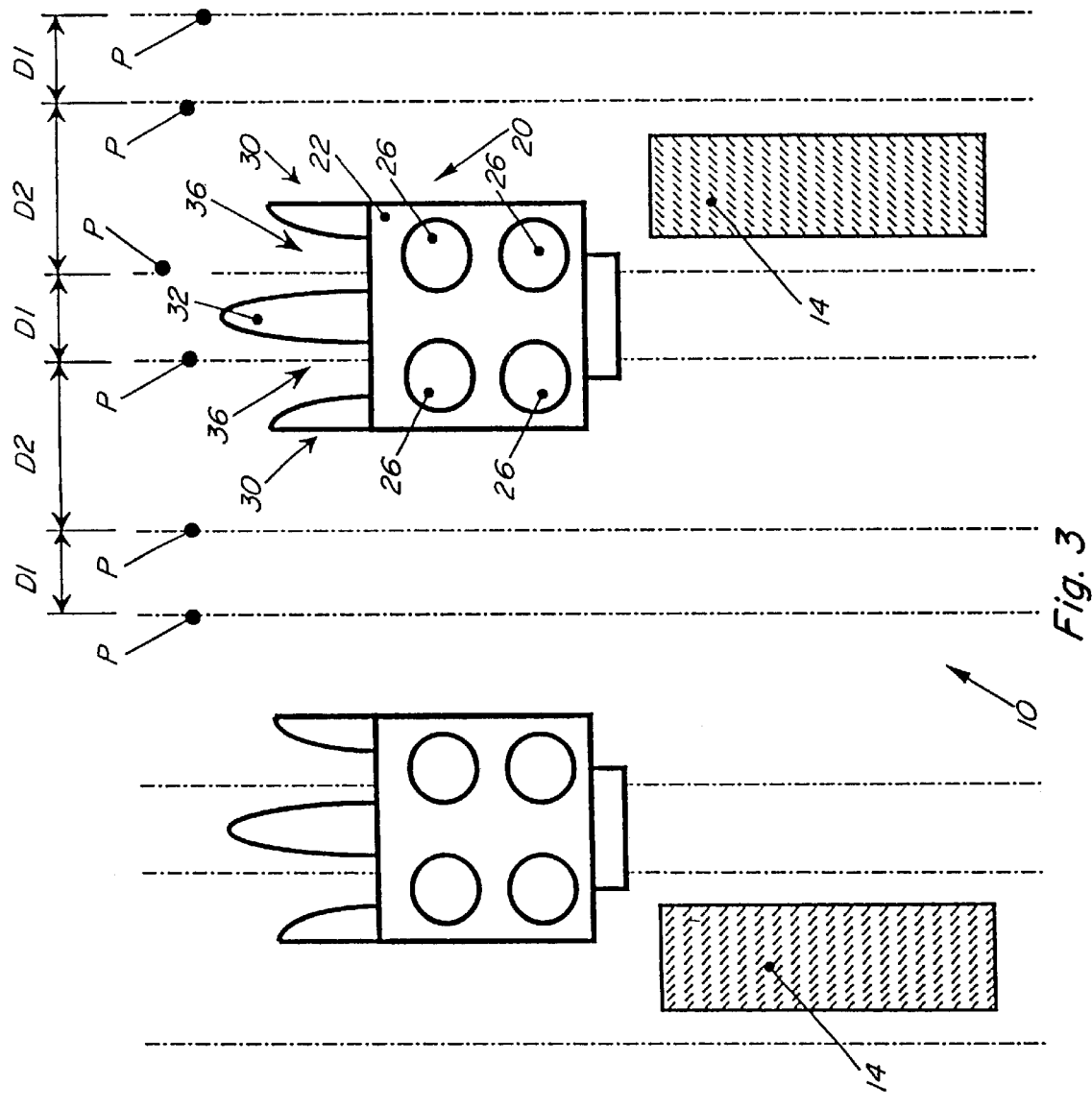
FIG. 3 is a schematic illustration of an alternative embodiment of the exemplar cotton picker units with multiple cotton picker rotors.
Figure 4:
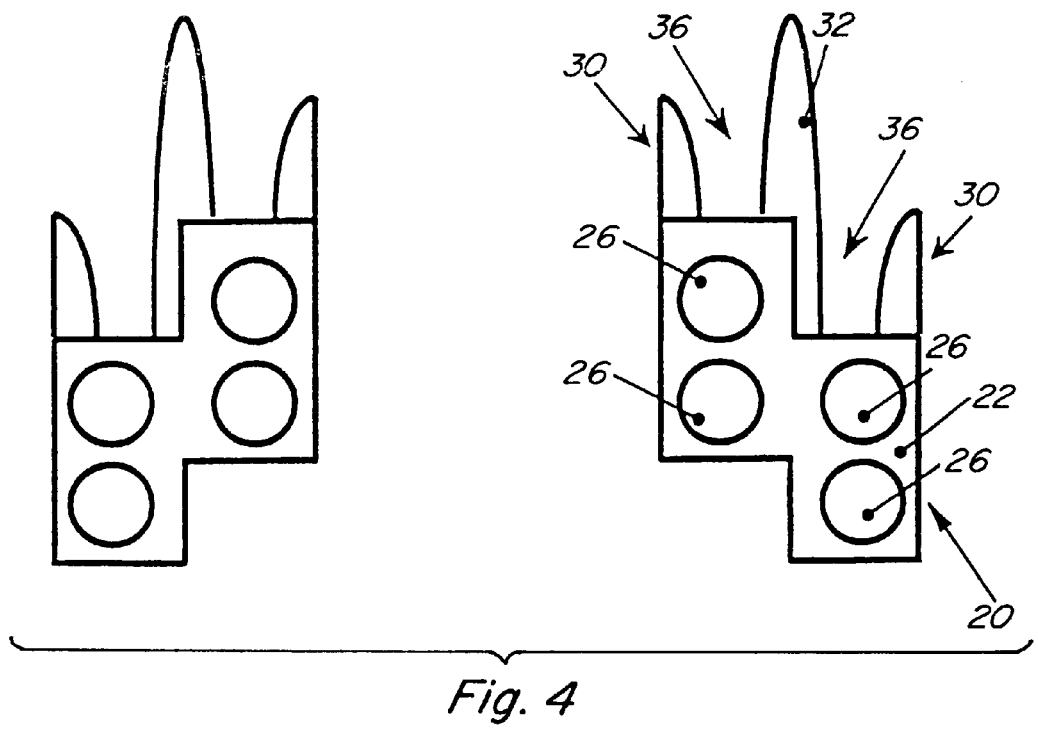
FIG. 4 is a schematic illustration of the cotton picker units depicted in FIG. 3 with multiple cotton picker rotors in a diagonally aligned embodiment.
Figure 6:
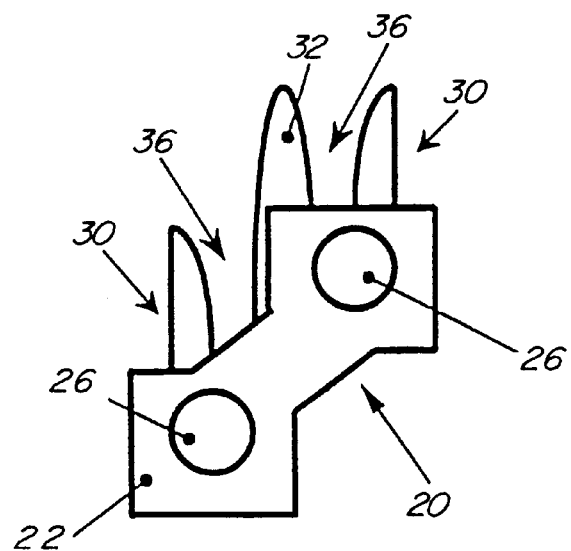
FIG. 6 is a schematic illustration of an exemplar cotton picker unit in an alternative embodiment of the diagonal configuration illustrated in FIG. 5.
Figure 5:
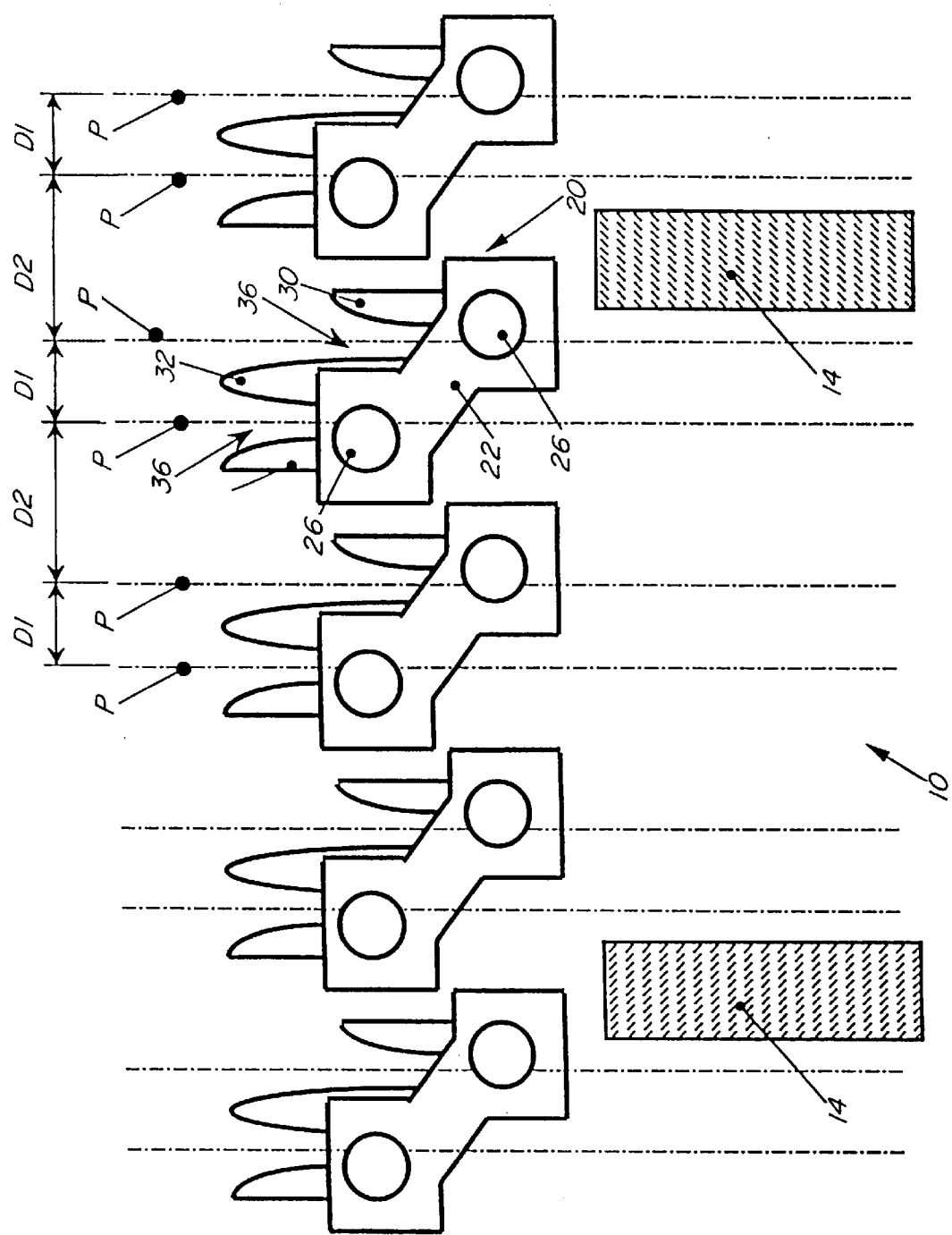
FIG. 5 is a schematic illustration of multiple cotton picker unit with dual cotton picker rotors aligned diagonally.
Figure 8:
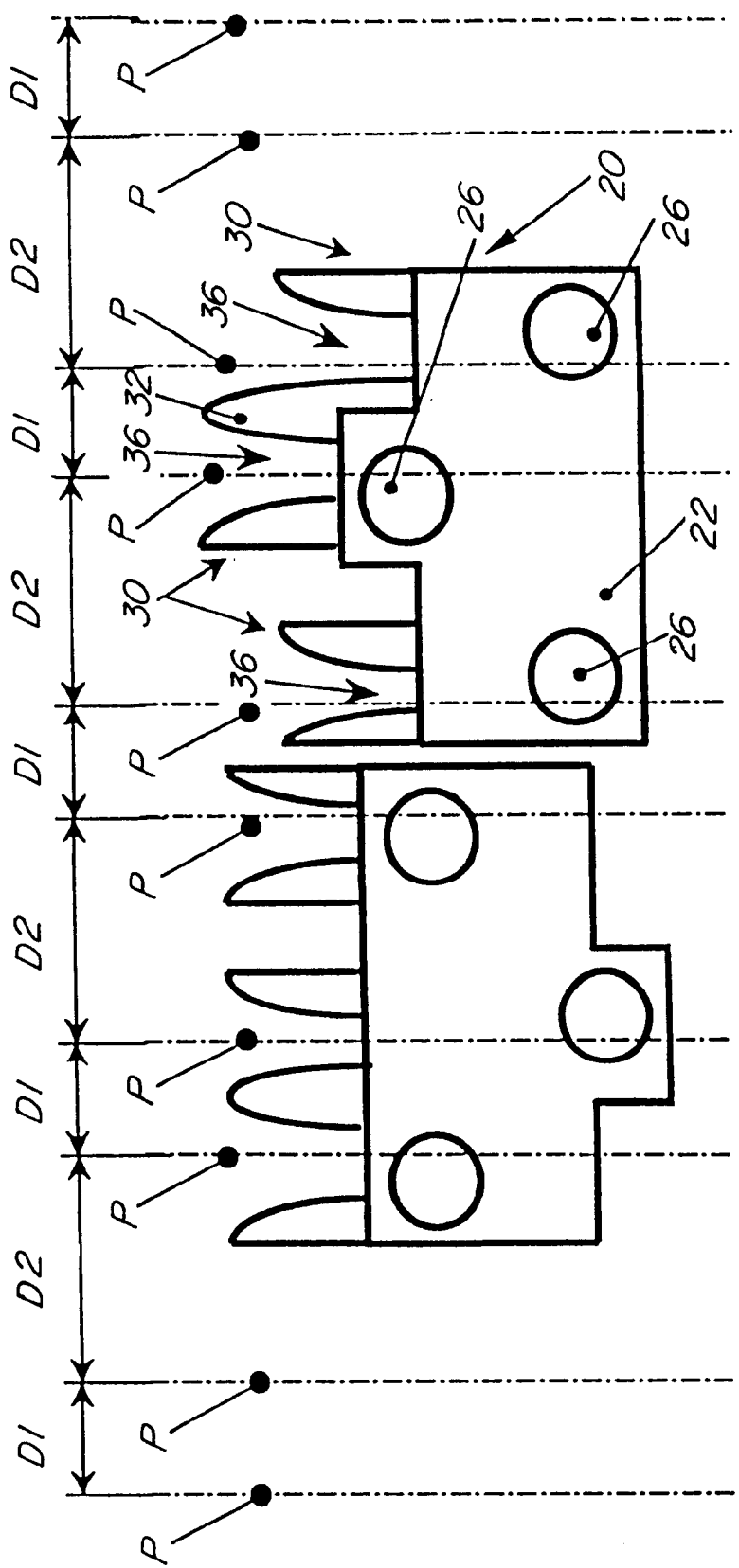
FIG. 8 is an alternative embodiment of the harvester depicted in FIG. 7.
Figure 9:
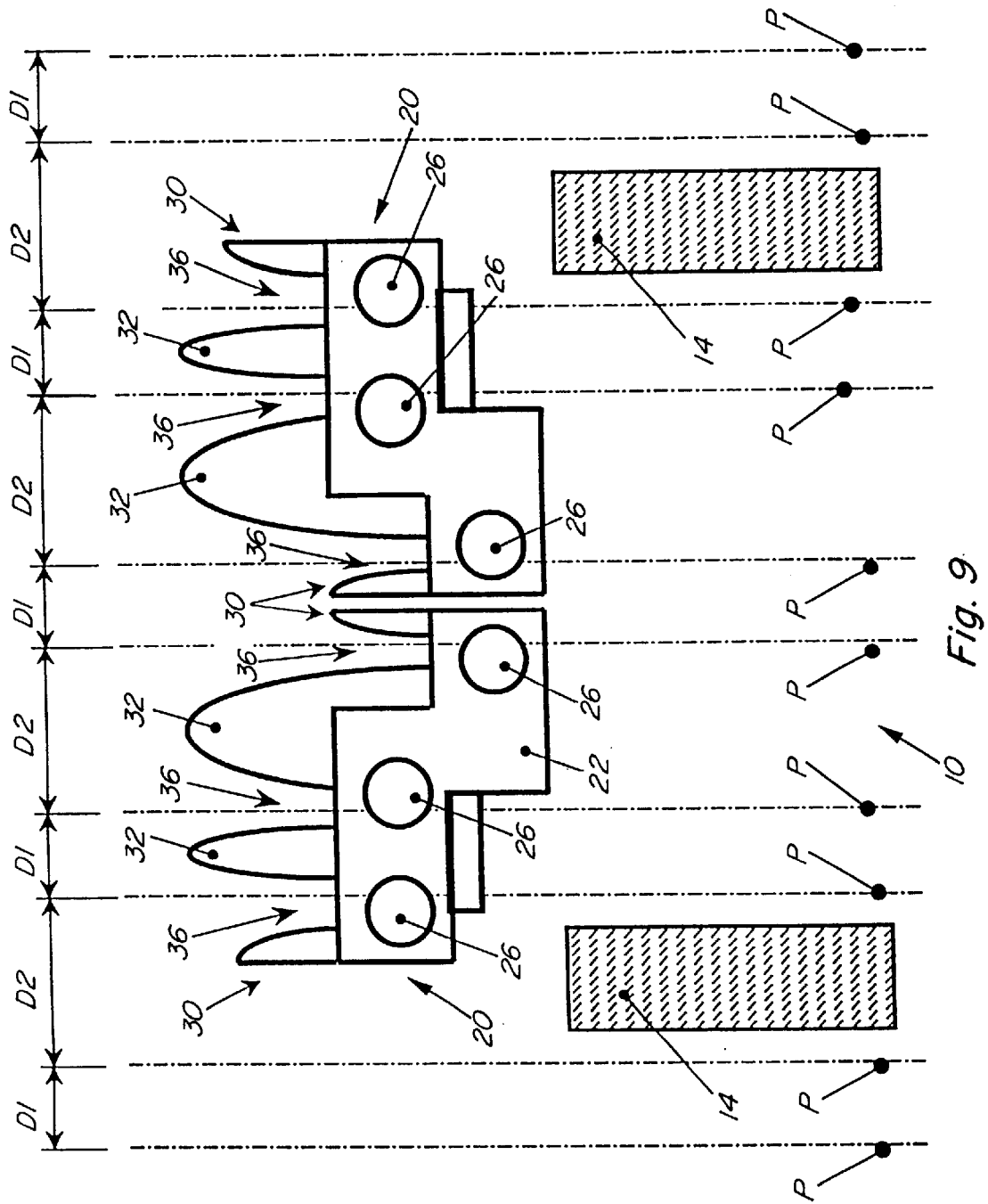
FIG. 9 is an alternative embodiment of the harvester depicted in FIG. 7.
Figure 10:
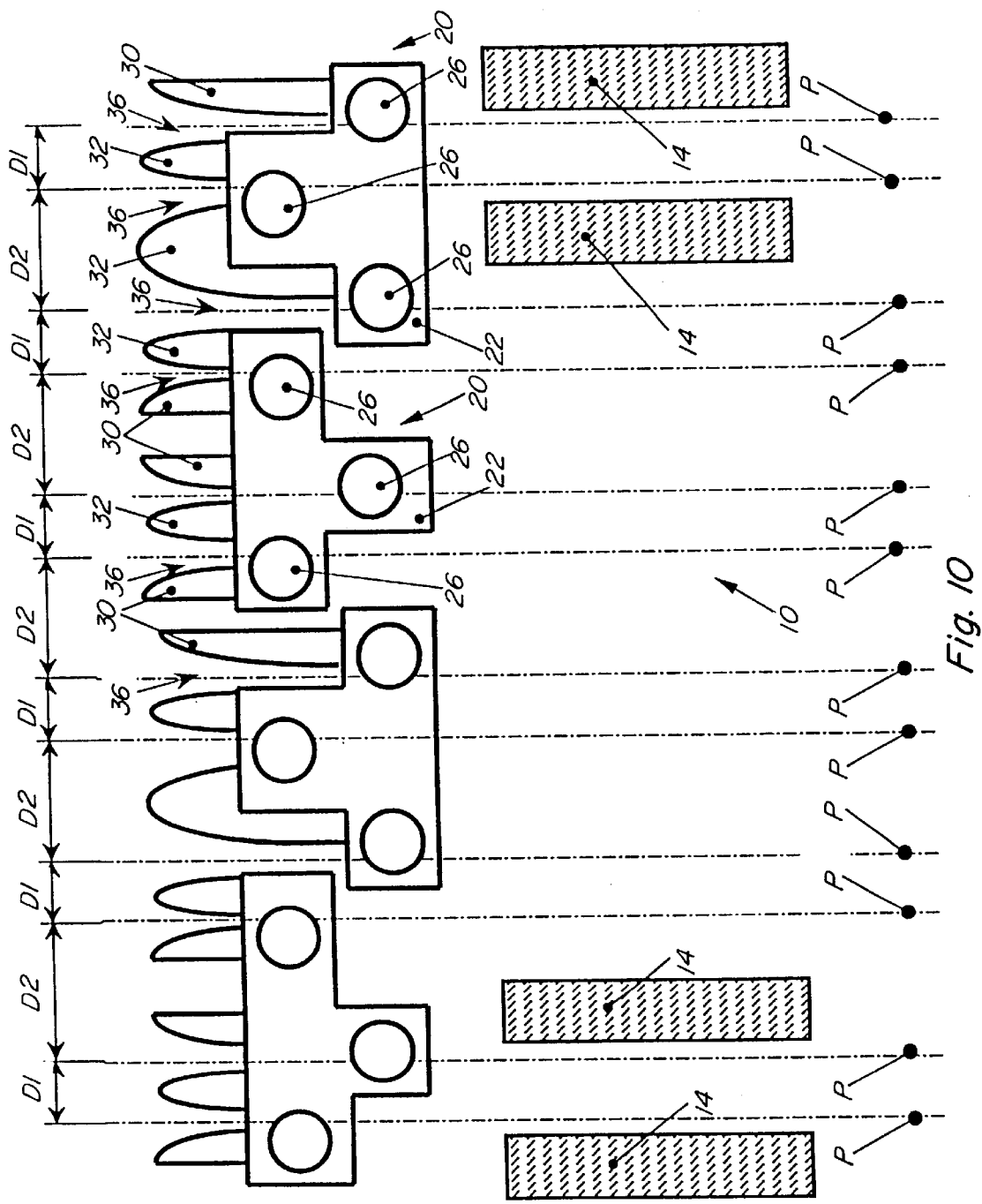
FIG. 10 is a schematic illustration of an exemplar multiple cotton picker multi-rotor unit mounted on the self-propelled vehicle having dual wheels straddling narrow cotton plant rows.
Figure 11:
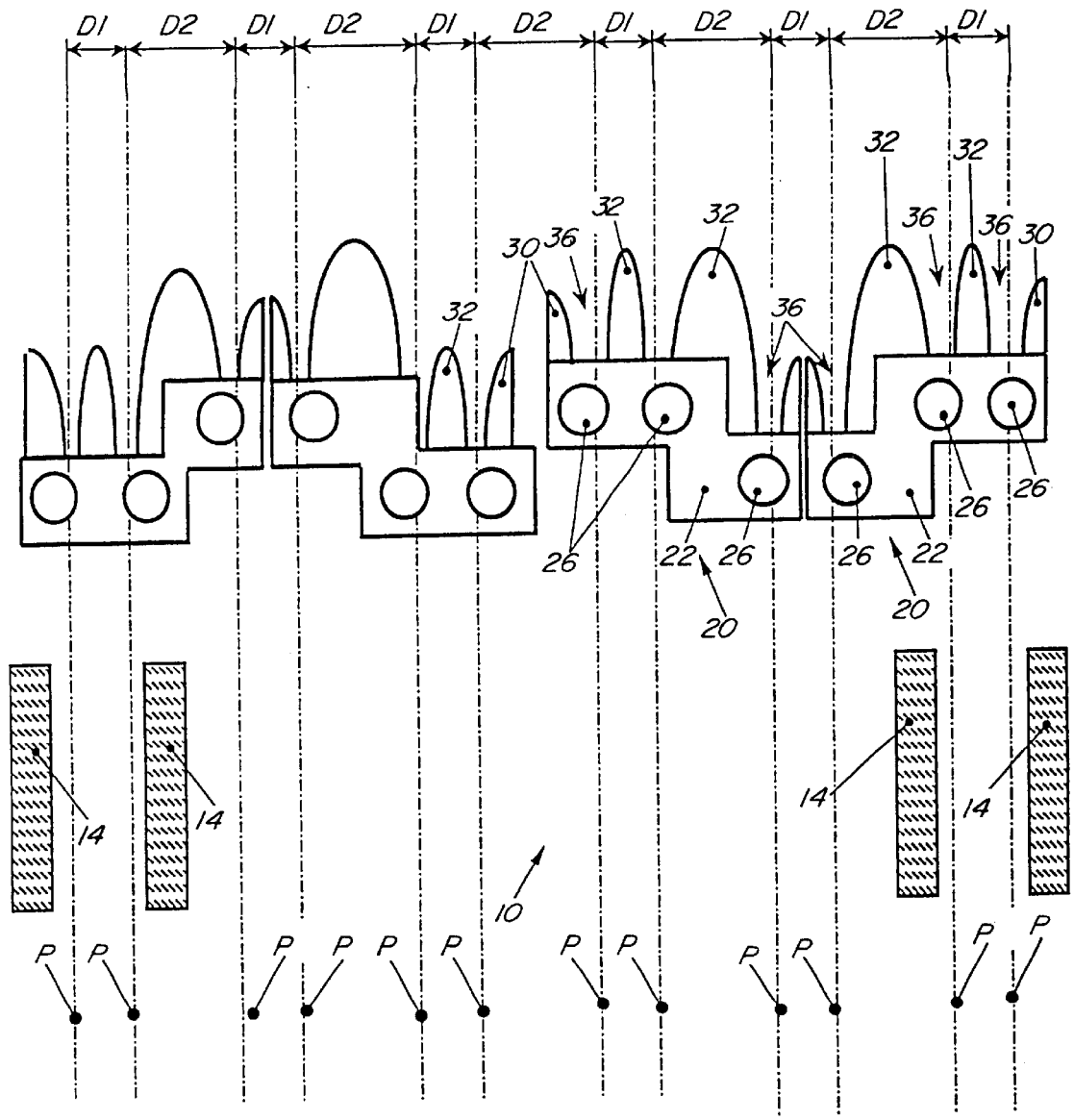
FIG. 11 is an alternative embodiment of the harvester depicted in FIG. 10.
Figure 12:
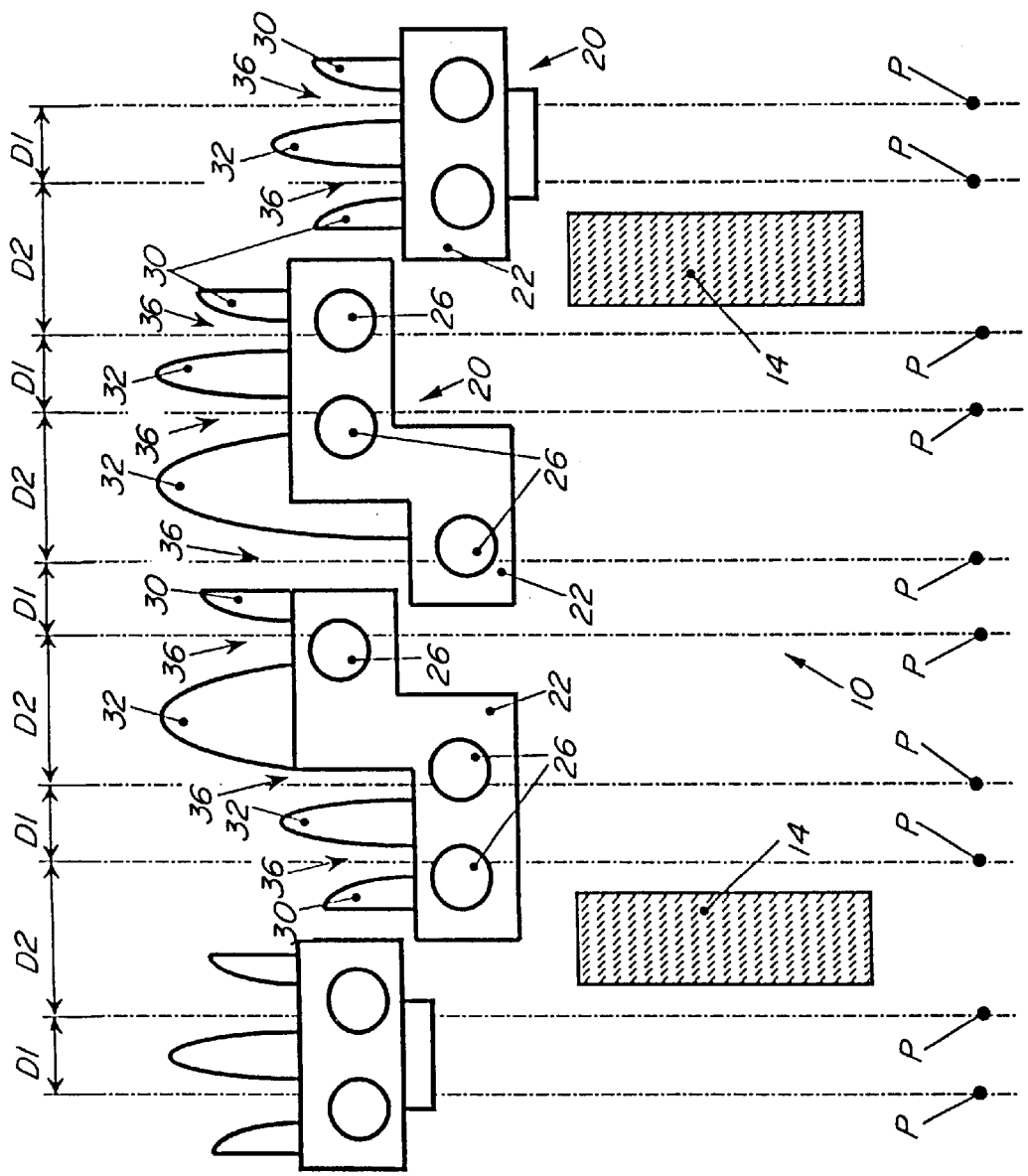
FIG. 12 is a schematic illustration of a combination of the present cotton picker units.
Figure 13:
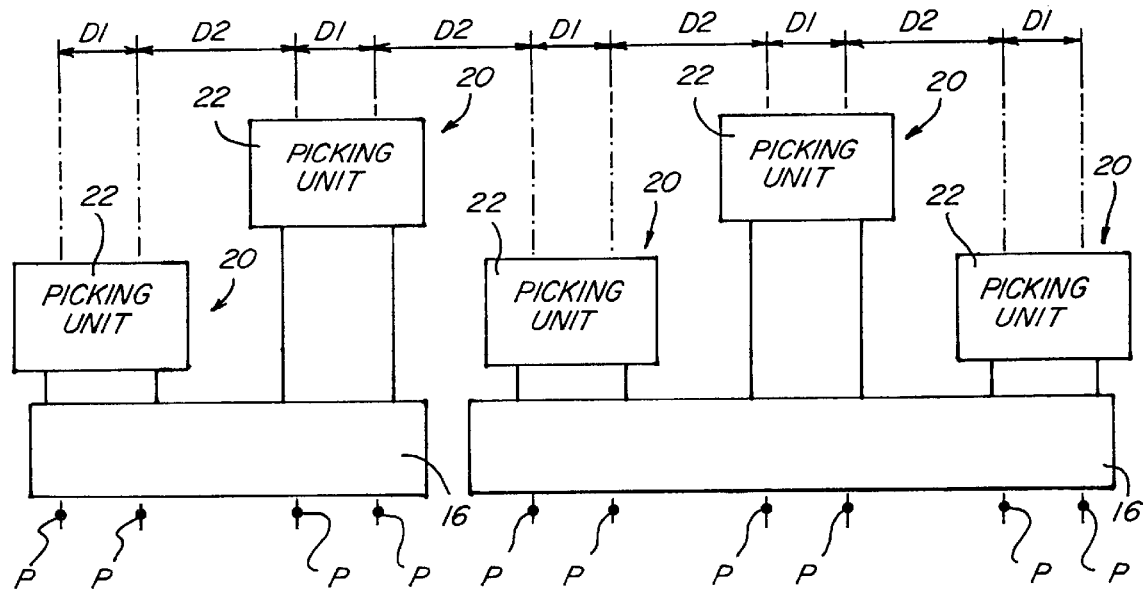
FIG. 13 is a schematic illustration of multiple cotton picker units on a mounting mechanism of a self-propelled vehicle (not shown).
Figure 14:
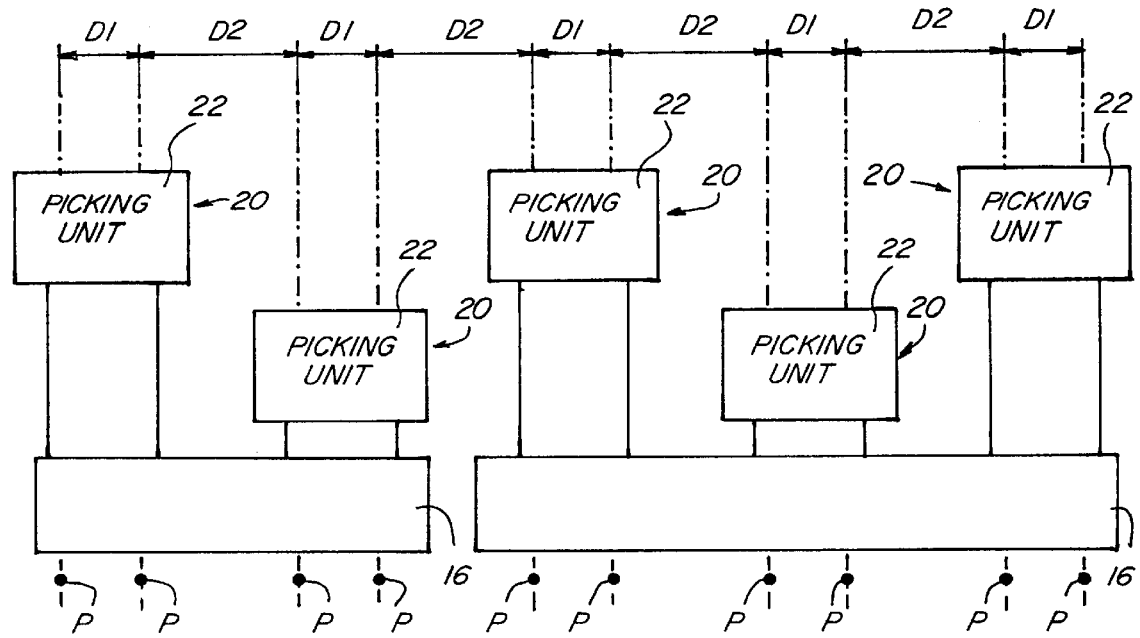
FIG. 14 is a schematic illustration of another arrangement of multiple cotton picker units of the present invention on a mounting mechanism of a self-propelled vehicle (not shown).
Figure 15:
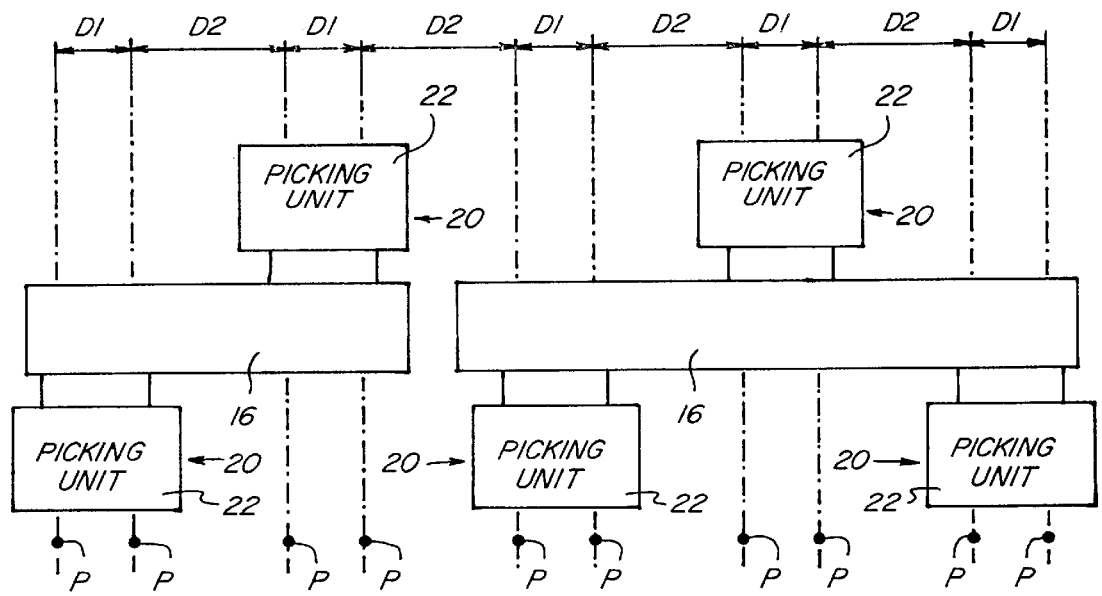
FIG. 15 is a schematic illustration of multiple cotton picker units of the present invention on a mounting mechanism of a self-propelled vehicle (not shown) with at least one of said cotton picker unit mounted behind the mounting mechanism.
Figure 16:
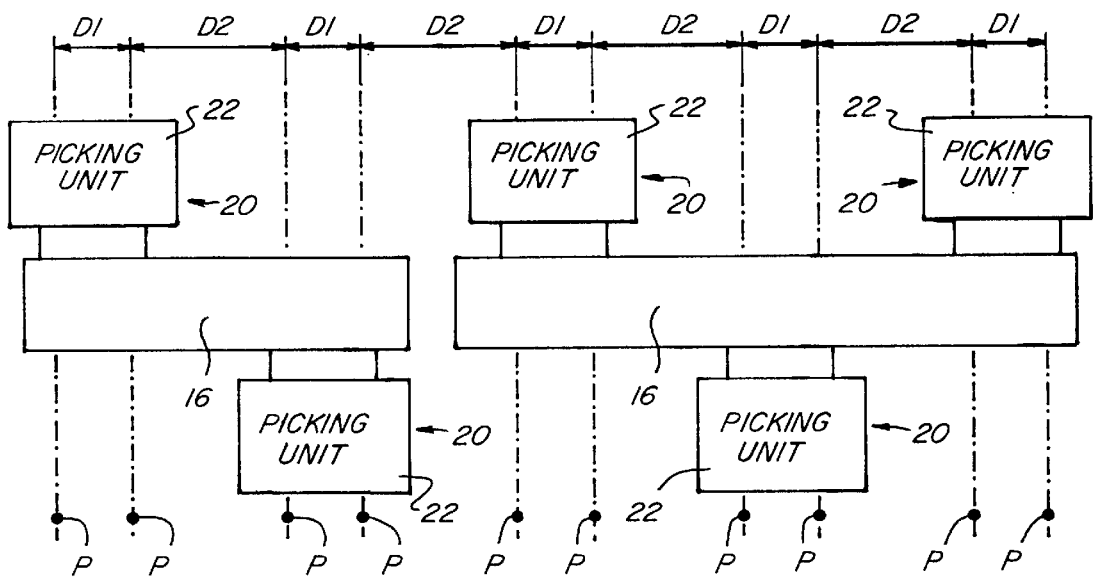
FIG. 16 is a schematic illustration of an alternative embodiment of the harvester depicted in FIG. 15.

The cotton harvester 10 has at least one cotton picker unit 20 mounted on a mounting mechanism 16 with said mounting mechanism 16 manipulated in an up or down direction by a lift arm 18. The lift arm 18 is mounted on the self-propelled vehicle 11 of the cotton harvester 10. The mounting mechanism 16 can be of any convenient design to accommodate the particular configuration of the cotton picker units 20 of a cotton harvester 10. The mounting mechanism can be a tool bar, a lift arm or a combination of a tool bar and a lift arm. A cotton picker unit 20 may be mounted on a tool bar or a lift arm or a combination of such devices. As shown in FIGS. 1 and 2, two cotton picker units 20 are mounted on the mounting mechanism 16 traverse to one another and aligned with adjacent rows of cotton plants P. Approximately midway between the space defined by the lateral plant lifter 30 of each of the cotton picker unit 20, is a wishbone plant lifter 32. The wishbone plant lifter 32 is moved between two closely planted parallel rows of cotton plants. The wishbone plant lifter 32 forms a part of a cotton plant channel 36 with a corresponding lateral plant lifter 30. The wishbone plant lifter 32 also extends forward of the cotton picker housing 22. FIGS. 4–12 depict alternative embodiments of the cotton picker unit 20 of the present invention wherein cotton picker rotors 26 are aligned diagonally or opposite to one another but also aligned with individual and adjacent rows of cotton plants. One embodiment of the cotton picker unit provides a means for varying the distance between the picker rotor/doffer column assemblies in the cotton picker unit 20. The picker rotor/ doffer column assembly, for this application, means the picker rotor 26, doffer column 28, plant lifters, compressor sheet 34 and their associated components. The means for varying is selected from a group comprising a slot, a rack and pinion, a worm-gear, a plurality of holes, a telescoping member and other conventional mechanism.

Another embodiment of the cotton harvester 10 mounts multiple picker rotors 26 and corresponding doffer columns 28 in a cotton picker housing 22 to form a multi-rotor unit such as three or four rotor/doffer assemblies. Such cotton picker is illustrated in FIGS. 7-12. Each cotton picker housing 22 is mounted on a mounting mechanism 16 included on a self-propelled vehicle 11 and is in mechanical communication with a power unit. The multi-rotor units have at least one lateral plant lifter 30 and at least one wishbone plant lifter 32 extending forward of the cotton picker housing 22. The arrangement of a wishbone plant lifter 32 and the lateral plant lifters 30 defines plant row channels 36 for receiving cotton plants planted in a row P with the plant channels 36 extending back into the cotton picker housing 22 to plant compressor sheets 34. The process of picking the cotton from the plants is as described above. Each of the picker rotors 26 which are supported in the cotton picker housing 22 for rotation about an upright axis 25 is aligned adjacent to the plant row channels 36. Each picker rotor 26 has a corresponding doffer column 28 supported in the housing 22 for rotation near each of the picker rotors 26 for removing the picked cotton from each picker rotor and moving the cotton towards an outlet 38 to an exhaust chute 37 which receives the cotton from the outlet 38. The picked cotton is then deposited in a cotton basket (not shown ) as described above. A trash exit 39 at the back of each cotton picker housing 22 ejects cotton plant debris not collected by the harvester. The multi-rotor unit can also be mounted behind the self-propelled vehicle and pulled through the cotton rows as generally depicted in FIG. 17.

Figure 17:
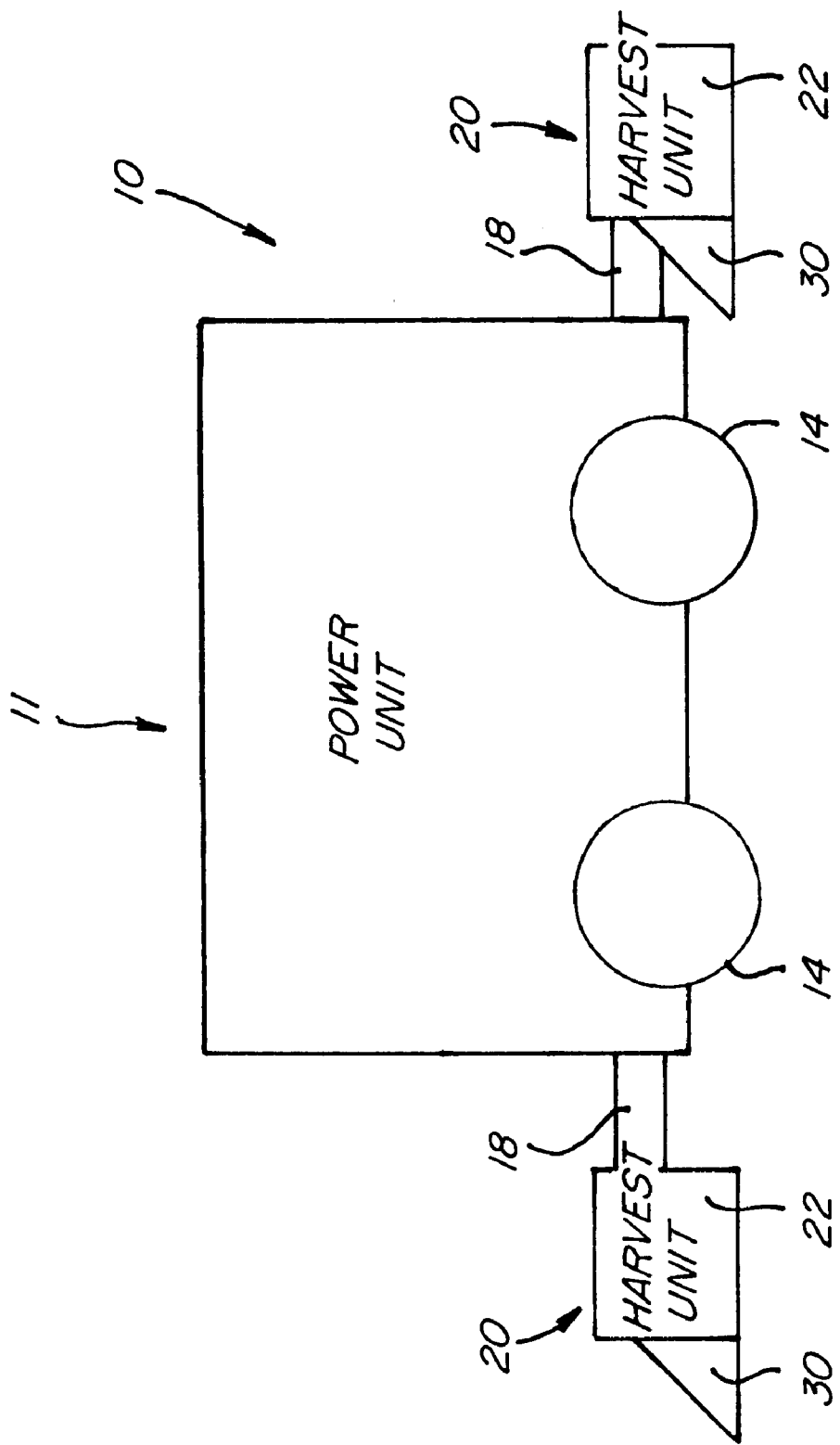
FIG. 17 is an illustration of a cotton harvester having cotton picker units mounted on the self-propelled vehicle.

FIG. 17 illustrates a cotton harvester 10 of the self-propelled vehicle 11 type which has a cotton picker unit 20 mounted in the front of the self-propelled vehicle and behind the self-propelled vehicle. A mounting mechanism attached to the self-propelled vehicle 11 supports the individual cotton picker housings 22. Any number of cotton picker units 20 can be configured in the cotton harvester 10 of the present invention as is appropriate for the particular mounting mechanism. It should be understood that the mounting mechanism and associated picker units may be attached to the vehicle at any convenient location.

FIGS. 13–16 depict various alternative embodiments of the cotton picker units 20 in dual rotor cotton picker housings 22 mounted on a mounting mechanism in front of and behind such mounting mechanism 16. Although dual rotor units are depicted it should be understood that the multi-rotor units can also be mounted in a similar fashion.

FIGS. 1 and 2 depict one each of a right-handed and left-handed picker rotor 26 mounted in a single cotton picker housing 22. It should be noted that only one plant row P is picked by one picker rotor 26. As noted in the background section of this application a typical or conventional cotton harvester has two picker rotor/doffer column configurations for picking cotton from each side of a single row of cotton. Such arrangement was suitable in the conventional planting of cotton rows which were typically much wider than 30 centimeters apart. Such arrangements are not suitable for narrow row cotton row plantings which are narrower than the rotor unit. As depicted in the FIGURES, the distance marked D1 between cotton planting rows P is narrower than a rotor unit and D2 is wider than a rotor unit between adjacent cotton rows P. The D2 spacing is typically needed to accommodate a person as well as the wheels of an agricultural device. The cotton harvester 10 is usually provided with a wheel shield 15 to protect the cotton plants as the cotton harvester 10 moves through the cotton field. The cotton picker units 20 of the present invention, as is shown in the various FIGURES, can be configured in a variety of arrangements to accommodate the particular cotton field.

Figure 18:
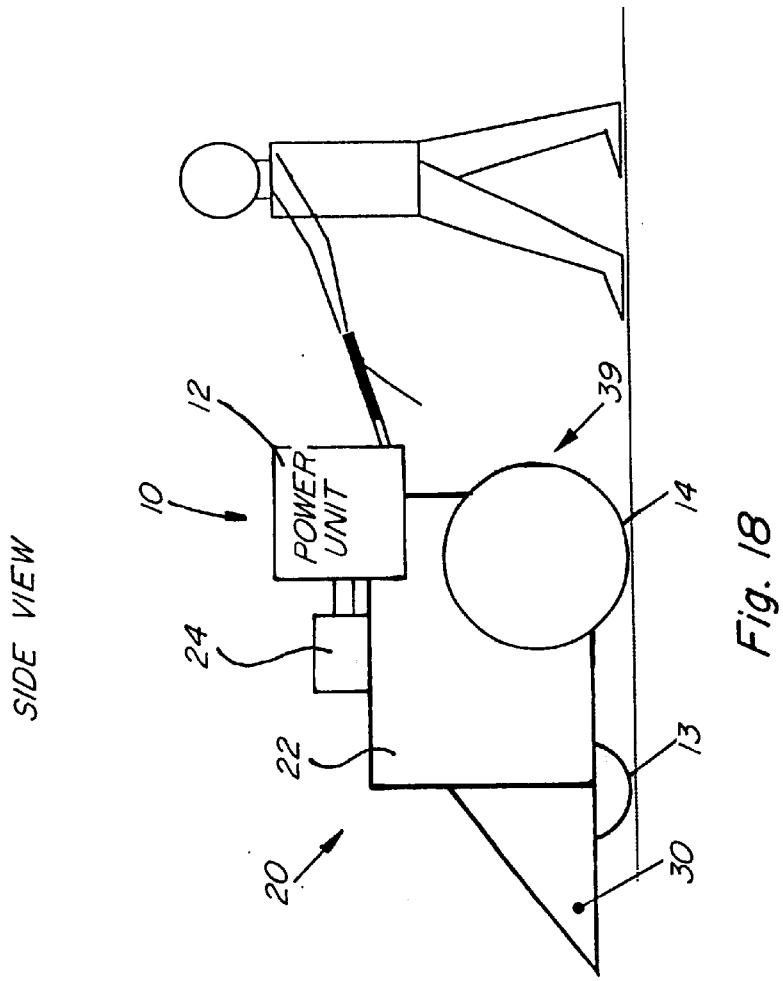
FIG. 18 is an illustration of the cotton picker unit configured in a walk-behind cotton harvester.
Figure 19:
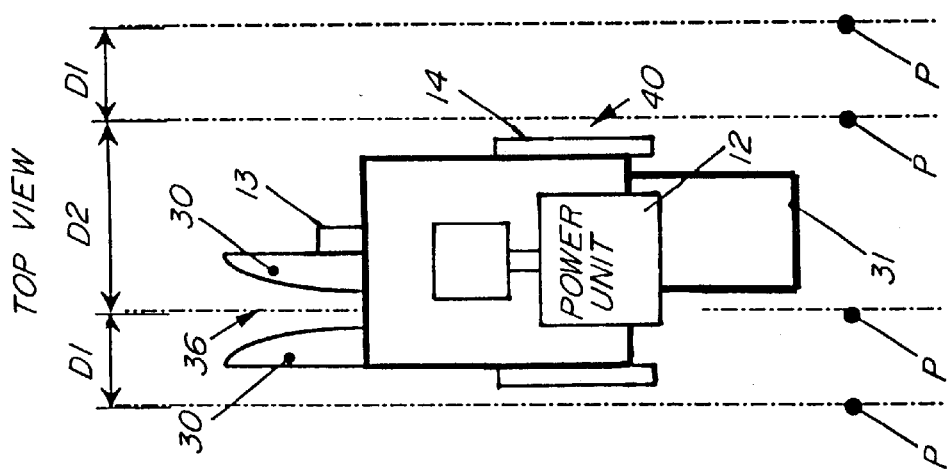
FIG. 19 is a top view of the walk-behind cotton harvester.

Applicant has been informed that narrow row cotton planting is prevalent in developing countries as well as particularly in the Peoples Republic of China. The planting pattern in those countries typically have the D1 distance being approximately 30 centimeters and the D2 distance being approximately 60 centimeters. And even though a self-propelled vehicle 11 of the present invention can be used in such situations, Applicant also provides a single cotton picker unit 20 configured as a walk-behind cotton harvester 10 for such use. FIGS. 18 and 19 depict an illustration of a walk-behind cotton harvester embodiment. The cotton picker housing 22 as previously described has a pair of lateral plant lifters 30 mounted forward of the cotton picker housing 22 and defines a plant channel 36 extending back into the housing 22 to a plant compressor sheet 34. At least one picker rotor 26 is mounted in the cotton picker housing 22 adjacent to the plant channel 36 and traverse to the plant compressor sheet 34. A corresponding doffer column 28 is mounted in the cotton picker housing 22 near each picker rotor 26. The doffer column 28 removes picked cotton from the picker rotor 26 and moves the picked cotton to an outlet 38 at the rear of the cotton picker housing 22. A power unit 12 is mounted on the cotton picker housing 22 and is in mechanical communication with the picker rotor 26 and doffer column 28 to impart the appropriate rotational motion to such devices. Mounted on the cotton picker housing 22 is a means for moving 40 the walk-behind cotton harvester 10. A handle 31 mounted on the housing 22 may also be provided. FIG. 19 depicts the walk-behind harvester in a single row configuration. It should be understood that a multiple row cotton picker unit can be configured as a walk-behind harvester. One embodiment of the walk-behind cotton harvester 10 has the means for moving 40 in mechanical communication with the power unit 12. A means for moving 40 is selected from a group comprising a pair of wheels 14 as shown in FIGS. 18 and 19 or a pair of tracks or a pair of skids or pulled by an animal. The wheels, tracks and skids can be of any conventional and convenient style. One embodiment of the walk-behind cotton harvester includes a front wheel 13 which assists the operator in maneuvering the walk-behind cotton harvester. In an embodiment of the walk-behind harvester the power unit 12 can be a hydraulic motor, an electric motor, or a fossil fuel engine in mechanical communication with the means for moving 40. The cotton picked from the cotton plant rows is exhausted into a cotton collecting device that can be towed or maneuvered behind the walk-behind harvest unit or can be deposited directly onto the ground for subsequent pick-up by any convenient method. It is expected that any culture that has had only hand picked cotton in the past will embrace even a walk-behind cotton harvester if a self-propelled vehicle is not a viable economic alternative.

Thus, it should be apparent that it has been provided in accordance with the present invention a narrow row cotton harvester in which a single or multiple rotor/doffer column arrangement for each row of cotton mounted in a variety of configurations on a self-propelled vehicle and a walk-behind cotton harvester has been disclosed. Although the invention has been described in conjunction with specific embodiments thereof, it is evident that many alternatives, modifications, and variations will be apparent to those ordinarily skilled in the art. For example, the cotton harvester may be towed or pushed by a separate work vehicle such as a tractor and coupled to the work vehicle for the necessary mechanical, hydraulic and electrical power to operate the cotton harvester. The cotton harvester may also be pulled by an animal, with a gear train coupled to the wheels and rotor/doffer for operating power. It is also contemplated that a cotton picker unit may be mounted alongside the self-propelled vehicle or work vehicle. Accordingly, it is intended to embrace all such alternatives, modifications and variations that fall within the spirit and scope of the appended claims.

What is claimed is:

1. A row unit movable in a forward direction for simultaneously picking cotton from at least two parallel side by side rows of cotton plants, the rows of cotton plants being spaced a predetermined distance apart in a transverse direction relative to the forward direction, the row unit comprising:
   a unitary housing having a forward end and an opposite rearward end, the unitary housing containing at least one element disposed between and defining two plant row channels extending forwardly to rearwardly through the housing at locations spaced apart in the transverse direction by an amount about equal to the predetermined distance for simultaneous passage of the at least two side by side rows of cotton plants through the row channels, respectively; and
   at least two picker rotors located within the unitary housing adjacent to the plant row channels therethrough, respectively, each of the picker rotors being located across the adjacent plant row channel from the at least one element and mounted for rotation about a generally upright axis and including members which extend into the adjacent plant row channel for picking cotton from the cotton plants passing therethrough as the picker rotor is rotated, each of the picker rotors being positioned and having a predetermined extent in the traverse direction which is sufficient such that the members extend substantially across the adjacent plant row channel so as to be capable of picking cotton from portions of the cotton plants passing therethrough adjacent to the at least one element defining the channel, the at least one element disposed between and defining the two plant row channels being sufficiently narrow in the transverse direction such that the amount the two plant row channels are spaced apart in the traverse direction is less than the predetermined extent of one of the picker rotors.

2. The row unit of claim 1, wherein at least two of the picker rotors are located in side by side relation generally along a line transverse to the forward direction.

3. The row unit of claim 2, comprising three of the forwardly to rearwardly extending plant row channels therethrough and three of the picker rotors located within the unitary housing adjacent to the plant row channels, respectively.

4. The row unit of claim 3, wherein at least two of the three picker rotors are located in side by side relation relative to the forward direction.

5. The row unit of claim 1, further comprising a second picker rotor located within the unitary housing adjacent to each of the plant row channels therethrough, respectively, the second picker rotor being mounted for rotation about a generally upright axis and including members which extend into the adjacent plant row channel for picking cotton from the cotton plants passing therethrough as the second picker rotor is rotated.

6. The row unit of claim 1, wherein the row unit is mounted to a rearward end of a self-propelled vehicle so as to be capable of being pulled thereby through a cotton field for the simultaneous passage of the at least two rows of cotton plants through the row channels of the row unit, respectively.

7. A cotton harvester for simultaneously picking cotton from cotton plants arranged in parallel side by side rows spaced a predetermined distance apart, comprising:
   a self-propelled vehicle for driving in a forward direction parallel to the rows; and
   at least one row unit mounted to the vehicle, the row unit including a unitary housing having a forward end and an opposite rearward end, the unitary housing containing at least one element disposed between and defining two plant row channels extending forwardly to rearwardly therethrough at locations spaced apart in a transverse direction relative to the forward direction by an amount about equal to the predetermined distance for simultaneous passage of the side by side rows of cotton plants individually through the row channels, and at least two picker rotors located within the unitary housing adjacent to the plant row channels therethrough, respectively, each of the picker rotors being located across the adjacent row channel from the at least one element and mounted for rotation about a generally upright axis and including members which extend into the adjacent plant row channel for picking cotton from the individual rows of the cotton plants passing therethrough as the picker rotor is rotated, each of the picker rotors being positioned and having a predetermined extent in the transverse direction which is sufficient such that the members extend substantially across the adjacent plant row channel so as to be capable of picking cotton from portions of the cotton plants passing therethrough adjacent to the at least one element defining the channel, the at least one element disposed between and defining the two plant row channels being sufficiently narrow in the transverse direction such that the amount the two plant row channels are spaced apart in the traverse direction is less than the predetermined extent of one of the picker rotors.

8. The cotton harvester of claim 7, wherein at least one of the row units comprises three of the forwardly to rearwardly extending plant row channels therethrough and three of the picker rotors located within the unitary housing thereof adjacent to the plant row channels, respectively.

9. The cotton harvester of claim 8, wherein at least two of the three picker rotors are located in side by side relation along a line generally transverse to the forward direction.

10. The cotton harvester of claim 7, wherein each of the row units further comprises a second picker rotor located within the unitary housing thereof adjacent to each of the plant row channels therethrough, respectively, the second picker rotor being mounted for rotation about a generally upright axis and including members which extend into the adjacent plant row channel for picking cotton from the cotton plants passing therethrough as the second picker rotor is rotated.

11. The cotton harvester of claim 7, comprising two of the row units located in side by side relation one to the other, one of the plant row channels of one of said two of the row units being located beside a second of said two of the row units and the second of said two of the row units including a plant lifter thereon positioned on a forward end thereof forming a portion of said one of the plant channels.

12. The cotton harvester of claim 7, comprising a plurality of the row units, some of the row units including two of the plant row channels therethrough and at least one of the row units including three of the plant row channels therethrough.

13. The cotton harvester of claim 7, comprising a plurality of the row units mounted on a mounting mechanism mounted to the vehicle and extending transversely relative to the forward direction.

14. The cotton harvester of claim 13, wherein the row units are arranged in forwardly to rearwardly staggered side by side relation along the mounting mechanism.

15. The cotton harvester of claim 13, wherein the mounting mechanism is mounted to the vehicle so that the row units are located forwardly of the vehicle, and a second plurality of the row units is mounted on a second mounting mechanism extending transversely relative to the forward direction and mounted to the vehicle such that the second plurality of the row units is located rearwardly of the vehicle.

16. The cotton harvester of claim 7, wherein the predetermined distance is about 30 centimeters.

17. The cotton harvester of claim 7, wherein the amount that the at least two plant row channels are spaced apart is variable.

18. A cotton harvesting unit movable in a forward direction for simultaneously and separately picking cotton from at least two parallel side by side rows of cotton plants, the rows of cotton plants being spaced a predetermined distance apart in a transverse direction relative to the forward direction, the harvesting unit comprising:

a structure having a forward end and an opposite rearward end, the structure including at least one element disposed between and defining at least two separate plant row channels extending forwardly to rearwardly through the structure at locations spaced apart in the transverse direction by an amount about equal to the predetermined distance for simultaneous passage of the at least two side by side rows of cotton plants through the row channels, respectively, and at least two picker rotors located adjacent to the plant row channels, respectively, each of the picker rotors being located across the adjacent plant row channel from the at least one element and mounted for rotation about a generally upright axis and including members which extend into the adjacent plant row channel for picking cotton from the cotton plants passing therethrough as the picker rotor is rotated, each of the picker rotors being positioned and having a predetermined extent in the transverse direction sufficient such that the members extend substantially across the adjacent plant row channel so as to be capable of picking cotton from portions of the cotton plants passing therethrough adjacent to the at least one element defining the channel, the at least one element disposed between and defining the two plant row channels being sufficiently narrow in the transverse direction such that the amount the two plant row channels are spaced apart in the traverse direction is less than the predetermined extent of one of the picker rotors.

19. The harvesting unit of claim 18, wherein at least two of the picker rotors are located in side by side relation generally along a line transverse to the forward direction.

20. The harvesting unit of claim 18, wherein the amount that the at least two plant row channels are spaced apart is variable.

21. The harvesting unit of claim 18, wherein the structure further comprises a second picker rotor located adjacent to each of the plant row channels therethrough, respectively, the second picker rotor being mounted for rotation about a generally upright axis and including members which extend into the adjacent plant row channel for picking cotton from the cotton plants passing therethrough as the second picker rotor is rotated.

22. The harvesting unit of claim 18, wherein the structure comprises a unitary housing containing the plant row channels and the picker rotors.

23. The cotton harvesting unit of claim 18 wherein the at least one element disposed between and defining the at least two separate plant row channels comprises a wishbone plant lifter.

24. The cotton harvesting unit of claim wherein the at least one element disposed between and defining the at least two separate plant row channels comprises at least one plant compressor sheet.

25. A cotton harvester for simultaneously picking cotton from cotton plants arranged in parallel rows spaced a predetermined distance apart, comprising:
- a self-propelled vehicle for driving in a forward direction parallel to the rows; and
- a plurality of row units mounted on a mounting mechanism mounted to the vehicle and extending transversely relative to the forward direction, each of the row units including a unitary housing having a forward end and an opposite rearward end, the unitary housing containing at least two plant row channels extending forwardly to rearwardly therethrough at locations spaced apart in a transverse direction relative to the forward direction by an amount about equal to the predetermined distance for simultaneous passage of the rows of cotton plants individually through the row channels, and at least two picker rotors located within the unitary housing adjacent to the plant row channels therethrough, respectively, each of the picker rotors being mounted for rotation about a generally upright axis and including members which extend into the adjacent plant row channel for picking cotton from the individual rows of the cotton plants passing therethrough as the picker rotor is rotated;

wherein the mounting mechanism is mounted to the vehicle so that the row units are located forwardly of the vehicle, and a second plurality of the row units is mounted on a second mounting mechanism extending transversely relative to the forward direction and mounted to the vehicle such that the second plurality of the row units is located rearwardly of the vehicle.

* * * * *